United States Patent Office 3,517,015
Patented June 23, 1970

3,517,015
TETRAHYDRO-ISOQUINO[2,1-d][1,4]
BENZODIAZEPINES
Hans Ott, Basel-Land, Switzerland, assignor to Sandoz-Wander, Inc., a corporation of Delaware
No Drawing. Continuation-in-part of application Ser. No. 549,441, May 12, 1966. This application Mar. 10, 1969, Ser. No. 805,832
Int. Cl. C07d 53/06
U.S. Cl. 260—288                                16 Claims

ABSTRACT OF THE DISCLOSURE

The invention discloses tetracyclic compounds which are tetrahydro-isoquino[2,1 - d][1,4]benzodiazepines having pharmacological effect on the central nervous system and useful, for example, as anti-depressants. Also disclosed is a preparation of said tetracyclic compounds and intermediates useful in such preparation, for example, the compounds which are 1-(halophenyl) - 2 - (2-alkoxy-2-iminoethyl) - 1,2,3,4-tetrahydroisoquinoline dihydrochlorides which may be reacted with ammonia or a strong base or an appropriately substituted primary amine to obtain the tetracyclic compounds.

This application is a continuation-in-part of my prior application Ser. No. 549,441, filed May 12, 1966, now abandoned.

This invention relates to tetracyclic compounds. In particular the invention pertains to pharmacologically active tetrahydro-isoquino [2,1 - d][1,4]benzodiazepines and intermediates which are useful in preparing the same.

The pharmacologically active compounds of the present invention may be represented structurally as follows:

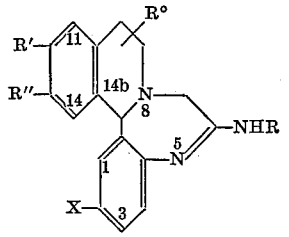

wherein:

X represents hydrogen; halogen of atomic weight of from 19 to 80, e.g., fluorine, chlorine or bromine, preferably chlorine; trifluoromethyl; nitro; or amino ($NH_2$);

$R°$ represents hydrogen or lower alkyl of 1 to 4 carbon atoms, e.g., methyl, ethyl, propyl, and butyl;

R represents hydrogen; lower alkyl, preferably containing from 1 to 4 carbon atoms, e.g., methyl, ethyl, propyl, isopropyl and butyl; lower alkenyl containing from 3 to 4 carbon atoms, e.g., allyl; propargyl; or aralkyl of the formula

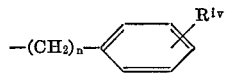

R'R" each represent hydrogen; lower alkyl of from 1 to 4 carbon atoms, e.g., methyl, ethyl, propyl and butyl; lower alkoxy of from 1 to 4 carbon atoms, e.g., methoxy, ethoxy, and propoxy; or R' and R" together form a methylenedioxy bridge;

$R^{iv}$ represents hydrogen; halogen of atomic weight of from 19 to 80, preferably chlorine; lower alkyl of from 1 to 4 carbon atoms, e.g., methyl, ethyl and propyl; or lower alkoxy of from 1 to 4 carbon atoms, e.g., methoxy, ethoxy and propoxy; and $n$ represents a whole number of from 1 to 3, inclusive.

A preferred process for preparation of compounds of formula I is illustrated below as a Reaction Sequence I, as follows:

REACTION SEQUENCE I

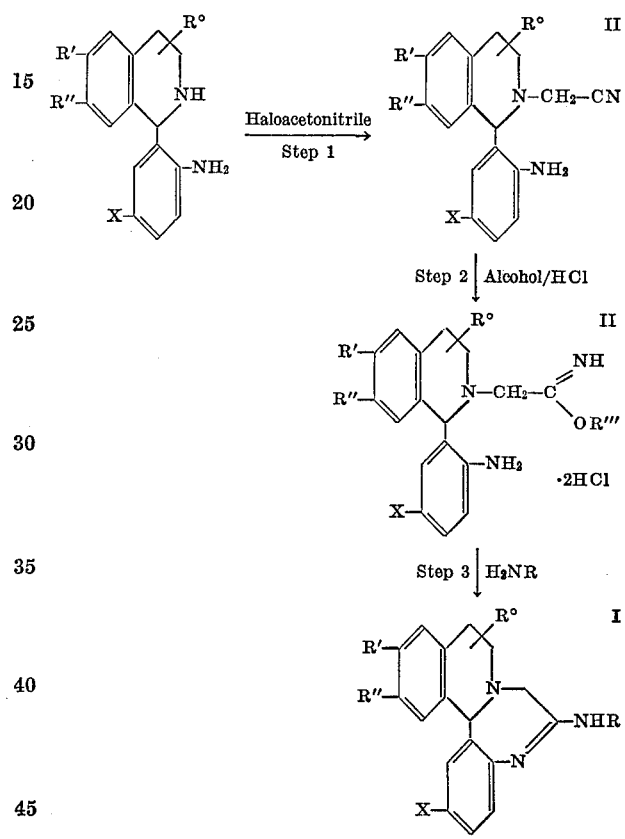

wherein X, R, $R°$, R' and R" are defined and R''' represents lower alkyl, preferably methyl or ethyl.

In Step 1 of the above process, a 1-(2-aminophenyl)-1,2,3,4-tetrahydroisoquinoline is reacted with a haloacetonitrile in a suitable inert organic solvent. The particular nitrile employed is not critical and the choice thereof is dependent only upon its availability and reactivity. The preferred nitrile, however, is chloroacetonitrile. Similarly, the choice of solvent is not critical and any appropriate solvent commonly used for such reaction can be employed. Suitable solvents include the lower alkanols, dioxane, tetrahydrofuran, benzene and toluene. It is preferred to carry out the reaction in the presence of a tertiary amine base such as triethylamine and at an elevated temperature of from about 50° C. up to reflux temperature. Preferably, the reaction is carried out at the reflux temperature of the system. The resulting cyanomethyl derivative (II) is readily recovered in conventional manner.

Step 2 of the process involves the conversion of the cyanomethyl derivative (II) to the corresponding iminoether (III). This is readily effected by reacting the formed with an anhydrous lower alkanol, preferably methanol or ethanol. Inasmuch as the iminoether is unstable, the reaction is carried out in the presence of dry hydrogen chloride so as to form the dihydrochloride salt thereof which is stable and can be recovered by conventional techniques. Since the reaction is exothermic, it is desirable to carry out the same at room temperature or below, providing external cooling when necessary.

In Step 3 of the process, the iminoether (as the dihydrochloride salt) is readily converted in conventional manner to the corresponding compounds of Formula I wherein R is hydrogen (and X, R°, R', and R'' are as defined) by treatment with amonia. This reaction is readily effected in aqueous medium and at room temperature. Alternatively, such compounds may be obtained by treatment of the iminoether salt with a strong strong base, such as sodium hydroxide or sodium methoxide in alcohol, in conventional manner. Compounds of Formula I wherein R is other than hydrogen are readily prepared in conventional manner by reacting the iminoether salt with an appropriate amine at room temperature and in a suitable solvent system such as alcohol or water or mixtures thereof. The resulting compounds of Step 3 are readily recovered in conventional manner.

Those compounds of Formula I wherein X is hydrogen (and R, R°, R' and R'' are as defined) are preferably prepared from the corresponding compounds of Formula I wherein X is chlorine, by conventional catalytic hydrogenation employing palladium as a catalyst.

Likewise those compounds of Formula I wherein X is amino (and R, R°, R' and R'' are as defined) are preferably prepared from the corresponding compounds of Formula I, wherein X is nitro, by conventional catalytic reduction with platinum or Raney Nickel.

Those starting compounds employed in the above process wherein X is other than nitro (and the other substituents are as defined) may be prepared by reacting a phenethylamine with an o-nitrobenzoylchloride to form the corresponding N-(β-phenethyl)-2-nitrobenzamide, cyclizing the latter to form the corresponding 1-(2-nitrophenyl)-3,4-dihydroisoquinoline and then reducing the latter. This process is illustrated by Reaction Sequence II below.

REACTION SEQUENCE II

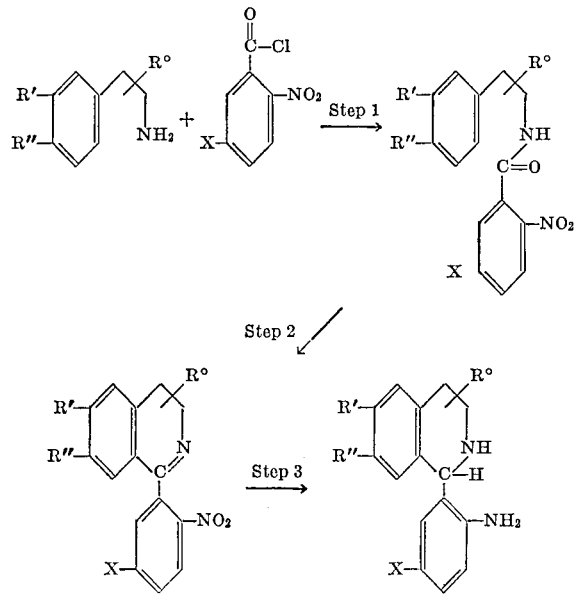

The conditions for carrying out the various steps of the above sequence are well known in the art. Thus, the reaction of Step 1 can be effected employing the same conditions used for carrying out the Schotten-Baumann Reaction and that of Step 2 effected by means of the Bischler-Napieralski Reaction. The reduction involved in Step 3 can be carried out in conventional manner either chemically employing zinc/hydrochloric acid, tin/hydrochloric acid or iron/hydrochloric acid or catalytically using platinum, palladium or nickel as a catalyst. Preferably, the reduction is carried out with sodium borohydride in the presence of palladium or charcoal.

Those starting compounds wherein X is nitro (and the other substituents are as defined) may be prepared by reacting a phenethylamine with a 2-halo-5-nitrobenzoylchloride to form the corresponding N-(β-phenylethyl)-2-halo-5-nitrobenzamide, cyclizing the latter to form the corresponding 1-(2-halo-5-nitrophenyl)-3,4-dihydroisoquinoline, then reacting the latter with ammonia to form the corresponding 1-(2-amino-5-nitrophenyl)-3,4-dihydroisoquinoline and then reducing the later. This process is illustrated by Reaction Sequence III on the following page.

REACTION SEQUENCE III

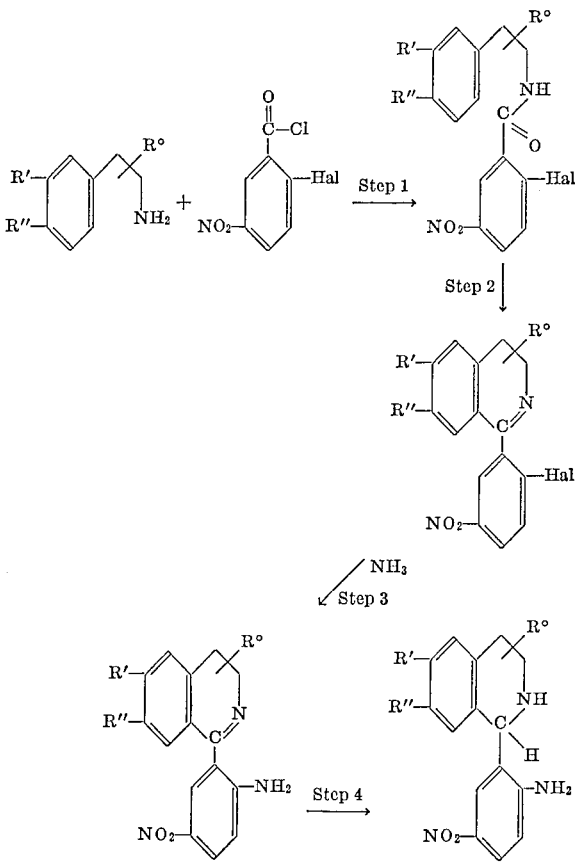

wherein R°, R' and R' are as previously defined and Hal represents halogen, preferably chlorine.

Step 1 and 2 of Reaction Sequence III are carried out in the same manner as described for Steps 1 and 2 of Reaction Sequence II. Step 3 involves the replacement of the halogen with an amino group by reaction with ammonia in conventional manner. Similarly, the reduction (Step 4) is carried out in conventional manner employing a suitable reducing agent (e.g., sodium borohydride) which does not affect the nitro group.

The process illustrated in Reaction Sequence III can also be used to prepare various other starting compounds employed in Reaction Sequence I.

The reactants employed in Step 1 of Reaction Sequences II and III are either known or can be prepared from available materials in the same manner utilized for preparing the known compounds.

The structure of compounds of Formula I indicates that such compounds can be in racemic form or in the form of optically active isomers. One may apply conventional techniques for separation and recovery of the respective isomers, and it will be evident that all the pharmaceutically effective isomers or such mixtures of isomers are included within the scope of this invention.

Also within the scope of the novel compounds provided by the invention are pharmaceutically acceptable salts not materially affecting the pharmacological effect of the compounds of Formula I. Such salts include the acid addition salts, e.g., the hydrochloride, fumarate, formate, acetate, citrate, sulfonate, malonate, tartrate, methane sulfonate, salicylate, hydronitrate and hydrosulfate. The acid addition salts may be produced as desired from the corresponding free bases by conventional procedures. Conversely, the free bases may be obtained from the salts by procedures known in the art.

The compounds of Formula I are useful because they possess pharmacological activity in animals. In particular, the compounds of the invention have mixed central nervous system activity which may be exhibited in various patterns of central nervous system activity by various of the compounds. However, in general, the compounds of the invention have the desirable feature of being useful as anti-depressants where the depression is associated with underlying anxiety, as indicated, for example, by a reinduction of hexabarbital in mice on interperitoneal administration. For this use, the dosage employed will, of course, vary depending upon known factors such as the compound used and the mode of administration. However, in general satisfactory results are obtained when administered at a daily dosage of from about 1 milligram to about 100 milligrams per kilogram of body weight, preferably given in divided doses 2 to 4 times a day, or in sustained release form. For most mammals the administration of from about 50 to 800 milligrams per day provides satisfactory results and dosage forms for internal administration comprise from about 12 to 400 milligrams of the compound in admixture with a solid or liquid carrier.

The compounds of the invention may be variously applied to effect other types of central nervous system activity in beneficial combination with that above-indicated. For example, the compounds of the invention such as those of Examples 1 and 4 may be employed as stimulants useful in the relief of depression of the endogenous type as indicated by behavior tests in mice on administration interperitoneally and by the potentiation of DOPA in mice on oral administration. The compounds such as those of Example 1 also exhibit a marked ability to potentiate amphetamine in mice on administration interperitoneally. The compounds of the invention such as those of Example 2 also potentiate DOPA and amphetamine while at the same time having a tranquilizing and/or sedative effect as indicated, for example, by behavior tests in mice on administration interperitoneally, by an inhibiting of chemically and electrically induced convulsions in mice on administration interperitoneally, and by the muscle relaxant test in mice on administration interperitoneally according to a modification of the method of Dunham et al., J. Am. Pharm. Assoc. 46: 208 (1957). The compounds of Formula I of the invention in which X is nitro are of particular interest as also having a tranquilizer or sedative effect as indicated, for example, by behavior tests in mice, by the inhibition of chemically and electrically induced convulsions, and by the muscle relaxant test. Such compounds as represented by those of Example 8 herein also exhibit additional anti-depressant activity as indicated by a potentiation of amphetamine.

As previously indicated, the above-mentioned beneficial pharmacological activities of the particular compounds of the invention may be obtained in combination and hence on administration in the same manner and with the same dosage range previously indicated for effecting the treatment of depression associated with anxiety.

For the above uses, the compounds may be combined with a pharmaceutically acceptable carrier, and such other conventional adjuvants as may be necessary, and are preferably administered orally in such forms as tablets, capsules, elixirs, suspensions and solutions. Such compositions may be prepared according to any method known in the art for the manufacture of pharmaceutical compositions, and such compositions may contain one or more conventional adjuvants, such as sweeting agents, flavoring agents, coloring agents and preserving agents, in order to provide an elegant and palatable preparation.

Tablets may contain the active ingredients in admixture with conventional pharmaceutical excipients, e.g., inert diluents such as calcium carbonate, sodium carbonate, lactose and talc, granulating and distintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Parts by wt. |
|---|---|
| 6 - amino - 2 - nitro-7,9,10,14b-tetrahydro-isoquino [2,1-d][1,4] benzodiazepine | 50 |
| Tragacanth | 2 |
| Lactose | 34.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only.

In the examples all temperatures are in degrees centigrade and the parts and percentages are by weight unless otherwise specified. The relationship between parts by weight and parts by volume is the same as that between the kilogram and the liter.

EXAMPLE 1

2-chloro-6-amino-7,9,10,14b-tetrahydro-isoquino-[2,1-d][1,4]benzodiazepine

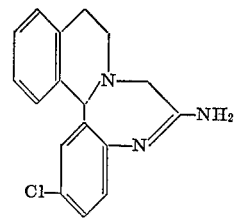

(A) Preparation of N-(β-phenethyl)-2-nitro-5-chlorobenzamide.—Add a solution of 6 parts of 2-nitro-5-chlorobenzoylchloride in 6 parts by volume of dioxane at 35° to 40° dropwise under vigorous stirring and within 30 minutes to the mixture of 3 parts of β-phenethylamine and 1 part of sodium hydroxide in 15 parts by volume of water and 5 parts by volume of dioxane. Stir another 30 minutes. Add more water to crystallize out the product. Recrystallize from ethyl acetate/diethyl ether to obtain N-(β-phenethyl)-2-nitro-5-chlorobenzamide as white prisms, M.P. 102° to 104°.

(B) Preparation of 1-(2-nitro-5-chlorophenyl)-3,4-dihydroisoquinoline.—Add 2 parts of phosphorus pentoxide to a hot solution of 1 parts of N-(β-phenethyl)-2-nitro-5-chlorobenzamide in 5 parts by volume of xylene and reflux the mixture for 5 hours.

Thereafter evaporate the organic solvent in vacuo and then decompose the sticky residue with ice water. Extract the obtained water layer with diethyl ether to remove residual starting material. Then make the extracted layer alkaline with concentrated sodium hydroxide.

Filter off the resulting crystalline material and recrystallize same from diethyl ether/pentane to obtain yellow prisms of 1-(2-nitro-5-chlorophenyl)-3,4-dihydroisoquinoline, M.P. 124° to 125°.

(C) Preparation of 1-(2-amino-5-chlorophenyl)-1,2,3,4 - tetrahydroisoquinoline. — Catalytically hydrogenate (0.02 part of platinum catalyst) a solution of 1 part of 1-(2-nitro-5-chlorophenyl)-3,4-dihydroisoquinoline in 5 parts by volume of acetic acid at room temperature and atmospheric pressure. After filtration and evaporation in vacuo crystallize the residue from ethyl acetate/diethyl ether to obtain 1-(2-amino-5-chlorophenyl-1,2,3,4-tetrahydroisoquinoline as white crystals, M.P. 125° to 127°.

(D) Preparation of 1-(2-amino-5-chlorophenyl)-2-cyanomethyl-1,2,3,4-tetrahydroisoquinoline.—Reflux a solution of 10 parts of 1-(2-amino-5-chlorophenyl)-1,2,3,4-tetrahydroisoquinoline 6 parts of chloroacetonitrile and 8 parts of triethylamine in 100 parts by volume of dry ethanol for 4 hours. Evaporate the ethanol in vacuo, dissolve the residue in methylene chloride and wash the organic layer once with water and once with saturated sodium chloride solution. Dry the methylene chloride solution over sodium sulfate and evaporate to dryness in vacuo. Crystallize the thus-obtained residue from ethanol to obtain 8.5 parts of 1-(2-amino-5-chlorophenyl)-2-cyanomethyl-1,2,3,4-tetrahydroisoquinoline as white prisms M.P. 125° to 127°.

(E) Preparation of 1-(2-amino-5-chlorophenyl)-2-(2-ethoxy-2-iminoethyl) - 1,2,3,4 - tetrahydroisoquinoline dihydrochloride.—A solution of 10 parts of 1-(2-amino-5-chlorophenyl)-2-cyanomethyl-1,2,3,4-tetrahydroisoquinoline in 160 parts by volume of absolute ethanol is saturated with dry hydrogen chloride gas under ice cooling. The white crystalline material which precipitates during the reaction, is filtered off and washed with ether to yield 12 parts of 1-(2-amino-5-chlorophenyl)-2-(2-ethoxy-2-iminoethyl)-1,2,3,4 - tetrahydroisoquinoline dihydrochloride, M.P. 276° to 280° (dec.).

(F) Preparation of 2-chloro-6-amino-7,9,10,14b-tetrahydro-isoquino[2,1-d][1,4]benzodiazepine. — Add 100 parts by volume of concentrated aqueous ammonia to 8 parts of 1-(2-amino-5-chlorophenyl)-2-(2-ethoxy-2-iminoethyl)-1,2,3,4-tetrahydroisoquinoline dihydrochloride and shake the mixture for 15 minutes at room temperature. Filter off the white crystalline precipitate and wash it with water. Crystallize the thus-obtained material from ethyl acetate/diethyl ether to obtain 5.5 parts of 2-chloro-6-amino - 7,9,10,14b - tetrahydro-isoquino[2,1-d][1,4]benzodiazepine, M.P. 210° to 215°.

EXAMPLE 2

2-chloro-6-methylamino-7,9,10,14b-tetrahydro-isoquino[2,1-d][1,4]benzodiazepine

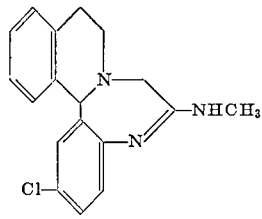

Add 100 parts by volume of a saturated alcoholic solution of methylamine at once to a suspension of 6 parts of 1 - (2 - amino-5-chlorophenyl)-2-(2-ethoxy-2-iminoethyl)-1,2,3,4-tetrahydroisoquinoline dihydrochloride in 100 parts by volume of ethanol and let the thus-obtained clear solution stand at room temperature for 2 hours. Evaporate the reaction mixture to dryness in vacuo, dissolve the thus-obtained residue in methylene chloride and wash the organic phase once with water and one with saturated sodium chloride solution. Dry the organic phase over sodium sulfate and evaporate the solvent in vacuo. Crystallize the residue from ethyl acetate/diethyl ether to obtain crystals of 2-chloro-6-methylamino-7,9,10,14b-tetrahydroisoquino[2,1 - d][1,4]benzodiazepine, M.P. 210° to 212°.

EXAMPLE 3

2-chloro-6-benzylamino-7,9,10,14b-tetrahydro-isoquino[2,1-d][benzodiazepine

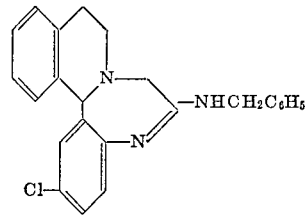

All 1 part of 1-(2-amino-5-chlorophenyl)-2-(2-ethoxy-2-iminoethyl)-1,2,3,4-tetrahydroisoquinoline dihydrochloride to a solution of 4 parts of benzylamine in 20 parts by volume of ethanol. Evaporate the thus-obtained clear solution to dryness in high vacuum. Dissolve the residue in methylene chloride and wash the resulting solution with water and then with saturated sodium chloride solution. Dry the organic phase over sodium sulfate and evaporate the methylene chloride in vacuo. Crystallize the residue from diethyl ether/petroleum ether to obtained 2-chloro-6-benzyamino-7,9,10,14b-tetrahydro - isoquino[2,1-d][1,4]benzodiazepine, M.P. 180° to 185°.

EXAMPLE 4

6-amino-7,9,10,14b-tetrahydro-isoquino[2,1-d][1,4]benzodiazepine

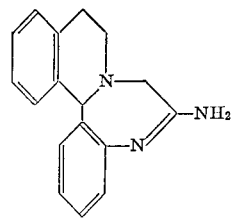

Dissolve 8.5 parts of 2-chloro-6-amino-7,9,10,14b-tetrahydro-isoquino[2,1-d][1,4]benzodiazepine in 200 parts by volume of glacial acetic acid. Add 1 part of palladium (10% on charcoal) and hydrogenate this mixture at room temperature and normal pressure until 1 mole of hydrogen has been taken up. Filter off the catalyst and evaporate the filtrate to dryness in vacuo. Crystallize the residue from ethyl acetate to obtain 6-amino-7,9,10,14b-tetrahydro-isoquino[2,1-d][1,4]benzodiazepine, M.P. 208° to 212° C.

EXAMPLE 5

Following the procedure of Step D of Example 1 and employing an equivalent amount of the tetrahydroisoquinolines enumerated below in place of the 1-(2-amino-5-chlorophenyl)-1,2,3,4-tetrahydroisoquinoline used therein, there are obtained the products set forth below.

| Tetrahydroisoquinoline | Product |
| --- | --- |
| 1-(2-amino-5-bromophenyl)-1,2,3,4-tetrahydroisoquinoline. | 1-(2-amino-5-bromophenyl)-2-cyanomethyl-1,2,3,4-tetrahydroisoquinoline. |
| 1-(2-amino-5-chlorophenyl)-6-methyl-1,2,3,4-tetrahydroisoquinoline. | 1-(2-amino-5-chlorophenyl)-2-cyanomethyl-6-methyl-1,2,3,4,-tetrahydroisoquinoline. |
| 1-(2-amino-5-chlorophenyl)-6-methoxy-1,2,3,4-tetrahydroisoquinoline. | 1-(2-amino-5-chlorophenyl)-2-cyanomethyl-6-methoxy-1,2,3,4-tetrahydroisoquinoline. |
| 1-(2-amino-5-chlorophenyl)-6,7-dimethoxy-1,2,3,4-tetrahydroisoquinoline. | 1-(2-amino-5-chlorophenyl)-2-cyanomethyl-6,7-dimethoxy-1,2,3,4-tetrahydroisoquinoline. |
| 1-(2-amino-5-trifluoromethylphenyl)-6,7-dimethyl-1,2,3,4-tetrahydroisoquinoline. | 1-(2-amino-5-trifluoromethylphenyl)-2-cyanomethyl-6,7-dimethyl-1,2,3,4-tetrahydroisoquinoline. |
| 1-(2-amino-5-nitrophenyl)-1,2,3,4-tetrahydroisoquinoline. | 1-(2-amino-5-nitrophenyl)-2-cyanomethyl-1,2,3,4-tetrahydroisoquinoline. |
| 1-(2-amino-5-chlorophenyl)-6,7-methylenedioxy-1,2,3,4-tetrahydroisoquinoline. | 1-(2-amino-5-chlorophenyl)-2-cyanomethyl-6,7-methylenedioxy-1,2,3,4-tetrahydroisoquinoline. |
| 1-(2-amino-5-chlorophenyl)-4-ethyl-1,2,3,4-tetrahydroisoquinoline. | 1-(2-amino-5-chlorophenyl)-2-cyanomethyl-4-ethyl-1,2,3,4-tetrahydroisoquinoline. |
| 1-(2-amino-5-chlorophenyl)-3-methyl-1,2,3,4-tetrahydroisoquinoline. | 1-(2-amino-5-chlorophenyl)-2-cyanomethyl-3-methyl-1,2,3,4-tetrahydroisoquinoline. |

EXAMPLE 6

Following the procedure of Step E of Example 1 and employing an equivalent amount of the products enumerated in Example 5 in place of the 1-(2-amino-5-chlorophenyl)-2-cyanomethyl-1,2,3,4-tetrahydroisoquinoline employed in Step E of Example 1, there are obtained the corresponding iminoether salts set forth below.

Iminoether salt 1-(2-amino-5-bromophenyl)-2-(2-ethoxy-2-iminoethyl)-1,2,3,4-tetrahydroisoquinoline dihydrochloride.

1-(2-amino-5-chlorophenyl)-2-(2-ethoxy-2-iminoethyl)-6-methyl-1,2,3,4-tetrahydroisoquinoline dihydrochloride.

1-(2-amino-5-chlorophenyl)-2-(2-ethoxy-2-iminoethyl)-6-methoxy-1,2,3,4-tetrahydroisoquinoline dihydrochloride 1-(2-amino-5-chlorophenyl)-2-(2-ethoxy-2-iminoethyl)-6,7-dimethoxy-1,2,3,4-tetrahydroisoquinoline dihydrochloride.

1-(2-amino-5-trifluoromethylphenyl)-(2-ethoxy-2-iminoethyl)-6,7-dimethyl-1,2,3,4-tetrahydroisoquinoline dihydrochloride.

1-(2-amino-5-nitrophenyl)-2-(2-ethoxy-2-iminoethyl)-1,2,3,4-tetrahydroisoquinoline dihydrochloride.

1-(2-amino-5-chlorophenyl)-2-(2-ethoxy-2-iminoethyl)-6,7-methylenedioxy-1,2,3,4-tetrahydroisoquinoline dihydrochloride.

1-(2-amino-5-chlorophenyl)-2-(2-ethoxy-2-iminoethyl)-4-ethyl-1,2,3,4-tetrahydroisoquinoline dihydrochloride.

1-(2-amino-5-chlorophenyl)-2-(2-ethoxy-2-iminoethyl)-3-methyl-1,2,3,4-tetrahydroisoquinoline dihydrochloride.

EXAMPLE 7

Following the procedure of Example 2 and employing an equivalent amount of the iminoether salts and amines enumerated below in place of the 1-(2-amino-5-chlorophenyl)-2-(2-ethoxy-2-iminoethyl) - 1,2,3,4 - tetrahydroisoquinoline dihydrochloride and methylamine employed in Example 2, respectively, there are obtained the benzodiazepines set forth below.

| Iminoether salt | Amine | Benzodiazepine |
| --- | --- | --- |
| 1-(2-amino-5-bromophenyl)-2-(2-ethoxy-2-iminoethyl)-1,2,3,4-tetrahydroisoquinoline dihydrochloride. | Allylamine | 2-bromo-6-allylamino-7,9,10,-14b-tetrahydro-isoquino[2,1-d]-[1,4]benzodiazepine. |
| 1-(2-amino-5-chlorophenyl)-2-(2-ethoxy-2-iminoethyl)-6-methyl-1,2,3,4-tetrahydroisoquinoline dihydrochloride. | Ethylamine | 2-chloro-6-ethylamino-12-methyl-7,9,10,14b-tetrahydro-isoquino[2,1-d][1,4]benzodiazepine. |
| 1-(2-amino-5-chlorophenyl)-2-(2-ethoxy-2-iminoethyl)-6-methoxy-1,2,3,4-tetrahydroisoquinoline dihydrochloride. | Propylamine | 2-chloro-6-propylamino-12-methoxy-7,9,10,14b-tetrahydro-isoquino[2,1-d][1,4]benzodiazepine. |
| 1-(2-amino-5-chlorophenyl)-2-(2-ethoxy-2-iminoethyl)-6,7-di-methoxy-1,2,3,4-tetrahydroisoquinoline dihydrochloride. | p-Chlorobenzylamine | 2-chloro-6-p-chlorobenzylamino-12,13-dimethoxy-7,9,10,14b-tetrahydro-isoquino[2,1-d][1,4]benzodiazepine. |
| 1-(2-amino-5-trifluoromethyl-phenyl)-2-(2-ethoxy-2-iminoethyl)-6,7-dimethyl-1,2,3,4-tetrahydroisoquinoline dihydrochloride. | p-Methyl-benzylamine | 2-trifluoromethyl-6-p-methyl-benzylamino-12,13-dimethyl-7,9,-10,14b-tetrahydro-isoquino[2,1-d]-[1,4]benzodiazepine. |
| 1-(2-amino-5-nitrophenyl)-2-(2-ethoxy-2-iminoethyl)-1,2,3,4-tetrahydroisoquinoline dihydrochloride. | Propargylamine | 2-nitro-6-propargylamino-7,9,10,-14b-tetrahydro-isoquino[2,1-d]-[1,4]benzodiazepine. |
| 1-(2-amino-5-chlorophenyl)-2-(2-ethoxy-2-iminoethyl)-1,2,3,4-tetrahydroisoquinoline dihydrochloride. | Phenethylamine | 2-chloro-6-phenethylamino-7,9,-10,14b-tetrahydro-isoquino-[2,1-d][1,4]benzodiazepine. |
| 1-(2-amino-5-chlorophenyl)-2-(2-ethoxy-2-iminoethyl)-6,7-methylenedioxy-1,2,3,4-tetrahydroisoquinoline dihydrochloride. | p-Methoxy-benzylamine | 2-chloro-6-p-methoxybenzylamino-12,13-methylenedioxy-7,9,10,14b-tetrahydro-isoquino[2,1-d][1,4]-benzodiazepine. |
| 1-(2-amino-5-chlorophenyl)-2-(2-ethoxy-2-iminoethyl)-4-ethyl-1,2,3,4-tetrahydroisoquinoline dihydrochloride. | Benzylamine | 2-chloro-6-benzylamino-10-ethyl-7,9,10,14b-tetrahydro-isoquino[2,1-d][1,4]benzodiazepine. |
| 1-(2-amino-5-chlorophenyl)-2-(2-ethoxy-2-iminoethyl)-3-methyl-1,2,3,4-tetrahydroisoquinoline dihydrochloride. | Ammonia | 2-chloro-6-amino-9-methyl-7,9,-10,14b-tetrahydro-isoquino[2,1-d]-[1,4]benzodiazepine. |

EXAMPLE 9

6-amino-2-nitro-7,9,10,14b-tetrahydro-isoquino[2,1-d][1,4]benzodiazepine

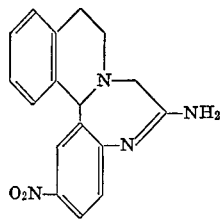

Step A: Preparation of N - (β - phenethyl)-5-nitro - 2-chlorobenzamide.—To a solution of 165 parts of 5-nitro-2-chloro-benzoylchloride in 350 parts by volume of dioxane is slowly added under ice-cooling a mixture of 100 parts of β-phenethylamine, 100 parts by volume of pyridine and 250 parts by volume of dioxane. Allow to stand overnight and pour resulting crystalline product into beaker with acetone, then make alkaline with 2 N NaOH, add water, filter, wash with water and suck fairly dry. Dissolve the residue in methylene chloride containing a small amount of methanol, separate from water, dry, evaporate solvent in vacuo and crystallize from methylene chloride/diether ether to obtain N-(β-phenethyl)-5-nitro-2-chlorobenzamide, M.P. 155° C.

Step B: Preparation of 1-(5 - nitro - 2 - chlorophenyl)-3,4-dihydroisoquinoline.—Add 400 parts of phosphorus pentoxide to a hot solution of 205 parts of N-(β-phenethyl)-5-nitro-2-chlorobenzamide in 2000 parts by volume of xylene and reflux the mixture for 17 hours.

Thereafter decant the organic solvent and then decompose the residue with ice water. Extract the obtained water layer with diethyl ether to remove residual starting material. Then make the extracted water layer alkaline with concentrated sodium hydroxide.

Filter off the resulting crystalline material and recrystallize same from diethyl ether/pentane to obtain 1-(5-nitro-2-chlorophenyl) - 3,4 - dihydroisoquinoline, M.P. 145° C.

Step C: Preparation of 1-(2-amino-5-nitrophenyl)-3,4-dihydroisoquinoline.—A mixture of 50 parts of 1-(5-nitro-2-chlorophenyl) - 3,4 - dihydroisoquinoline with 2 parts of cuprous chloride, 2 parts copper powder and 150 parts by volume anhydrous ammonia is heated at 70° C. in a steel bomb for 20 hours. After cooled the ammonia is evaporated and the residue is dissolved in methylene chloride, the solution is filtered, shaken with water and concentrated to a dark foamy material which is 1-(2-amino-5-nitrophenyl)-3,4-dihydroisoquinoline and used as such without crystallization in Step D, below.

Step D: Preparation of 1-(2-amino-5-nitrophenyl)-1,2,3,4-tetrahydroisoquinoline.—To a solution of 48 parts of crude 1-(2-amino-5-nitrophenyl)-3,4-dihydroisoquinoline obtained from Step C, above, in 1000 parts by volume of 95% ethanol is added 25 parts sodium borohydride. The resulting solution is refluxed for 2.5 hours, the mixture concentrated to remove most of the ethanol and then treated with 2 N hydrochloric acid. The resulting mixture is allowed to stand for ½ hour at 60° C., then made alkaline with 30% NaOH, and then extracted with methylene chloride to obtain an oil which is treated with maleic acid to obtain a maleate salt which is dissolved in water and converted to the free base which is crystallized from ethanol to obtain 1-(2-amino-5-nitrophenyl)-1,2,3,4-tetrahydroisoquinoline, M.P. 188° C.

Step E: Preparation of 1-(2-amino-5-nitrophenyl)-2-cyanomethyl-1,2,3,4-tetrahydroisoquinoline.—A solution of 5.7 parts of 1-(2-amino-5-nitrophenyl)-1,2,3,4-tetrahydroisoquinoline, 3.3 parts of chloroacetonitrile and 4.4 parts of triethylamine in 70 parts by volume of ethanol and 20 parts by volume of dioxane is refluxed for 20 hours. The resulting solution is evaporated, the residue dissolved in ethyl acetate, extracted 3 times with 2 N hydrochloric acid solution, the organic phases combined, treated with charcoal, filtered through "Celite," concentrated and recrystallized from methylene chloride/ethanol to obtain 1-(2-amino-5-nitrophenyl)-2-cyanomethyl,1,2,3,4-tetrahydroisoquinoline, M.P. 222–225°. C.

Step F: Preparation of 1-(2-amino-5-nitrophenyl)-2-2-ethoxy-2-iminoethyl)-1,2,3,4-tetrahydroisoquinoline dihydrochloride.—A suspension of 4.1 parts of 1-(2-amino-5-nitrophenyl)-2-cyanomethyl - 1,2,3,4 - tetrahydroisoquinoline in 30 parts by volume of absolute ethanol is saturated with dry hydrogen chloride gas under ice cooling. The yellow crystalline material which precipitates during the reaction is filtered off and dried to obtain 1-(2-amino-5-nitrophenyl)-2-(2-ethoxy-2-iminoethyl) - 1,2,3,4-tetrahydrosiquinoline dihydrochloride.

Step G: Preparation of 6-amino-2-nitro-7,9,10,14b-tetrahydroisoquinolo[2,1-d][1,4]benzodiazepine.—The solution formed on mixing .85 part of sodium to 25 parts by volume of absolute ethanol is added to a suspension of 5.2 parts of 1-(2-amino-5-nitrophenyl)-2-(2-ethoxy-2-iminoethyl)-1,2,3,4 - tetrahydroisoquinoline dihydrochloride in 30 parts by volume ethanol. The resulting mixture after stirring for 15 minutes is evaporated and the residue treated with water and methylene chloride to obtain a crystalline material which is filtered and recrystallized from methanol/methylene chloride (1:9) to obtain 6 - amino-2-nitro - 7,9,10,14b - tetrahydro-isoquino-[2,1-d][1,4]benzodiazepine, M.P. 165–170° C.

What is claimed is:

1. A compound selected from the group consisting of those of the formula

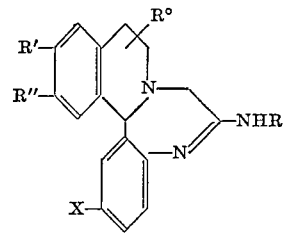

and pharmaceutically acceptable acid addition salts thereof, wherein

X is hydrogen, halogen, trifluoromethyl, nitro or amino;

R° is in either the 9- or 10-position and is hydrogen or lower alkyl;

R is hydrogen, lower alkyl, lower alkenyl having 3 to 4 carbon atoms, propargyl or aralkyl of the formula

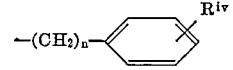

R' and R" each are hydrogen, straight chain lower alkyl, straight chain lower alkoxy or together form a methylenedioxy bridge;

R$^{iv}$ is hydrogen, halogen, lower alkyl or lower alkoxy; and n is a whole number of from 1 to 3, inclusive.

2. A compound of claim 1 wherein R°, R' and R" are hydrogen, R is hydrogen, lower alkyl or benzyl and X is hydrogen or halogen.

3. A compound of claim 1 in which R is hydrogen.

4. A compound of claim 3 in which R°, R' and R" are hydrogen.

5. A compound of claim 4 in which X is halogen.

6. The compound of claim 5 which is 2-chloro-6-amino-7,9,10,14b - tetrahydro-isoquino[2,1-d][1,4]benzodiazepine.

7. The compound of claim 4 which is 6-amino-7,9,10,14b-tetrahydro-isoquino[2,1-d][1,4]benzodiazepine.

8. A compound of claim 1 in which R is lower alkyl.

9. A compound of claim 8 in which R°, R' and R" are hydrogen.

10. A compound of claim 9 in which X is hydrogen or halogen.

11. A compound of claim 10 which is 2-chloro-6-methylamino-7,9,10,14b - tetrahydroisoquino[2,1-d][1,4]benzodiazepine.

12. A compound of claim 1 in which X is nitro.

13. A compound of claim 12 in which R°, R' and R'' are hydrogen.

14. A compound of claim 13 in which R is hydrogen or lower alkyl.

15. The compound of claim 14 which is 6-amino-2-nitro-7,9,10,14b - tetrahydro-isoquino[2,1-d][1,4]benzodiazepine.

16. The compound of claim 2 which is 2-chloro-6-benzylamino-7,9,10,14b - tetrahydroisoquino[2,1-d][1,4]benzodiazepine.

References Cited

UNITED STATES PATENTS

| | | | |
|---|---|---|---|
| 3,133,926 | 5/1964 | Kuehne | 260—288 X |
| 3,457,265 | 7/1969 | Seeger et al. | 260—288 |
| 3,420,818 | 1/1969 | Ott | 260—288 X |
| 3,433,794 | 3/1969 | Ott | 266—294.8 |
| 3,435,038 | 3/1968 | Hardtmann et al. | 260—286 |
| 3,435,040 | 3/1969 | Hardtmann et al. | 260—288 |

DONALD G. DAUS, Primary Examiner

U.S. Cl. X.R.

260—286, 465.7, 544, 346.2, 570.8, 689, 558, 583; 424—258